United States Patent
Hargett et al.

(10) Patent No.: US 12,404,646 B2
(45) Date of Patent: Sep. 2, 2025

(54) METHODS OF MANUFACTURING SYNTHETIC BALES

(71) Applicants: Dan Hargett, Inman, SC (US); A. V. Moody, Jr., Rutherfordton, NC (US)

(72) Inventors: Dan Hargett, Inman, SC (US); A. V. Moody, Jr., Rutherfordton, NC (US)

(73) Assignee: Geohay, LLC, Inman, SC (US)

( * ) Notice: Subject to any disclaimer, the term of this patent is extended or adjusted under 35 U.S.C. 154(b) by 0 days.

(21) Appl. No.: 18/978,910

(22) Filed: Dec. 12, 2024

(65) Prior Publication Data

US 2025/0198103 A1  Jun. 19, 2025

Related U.S. Application Data

(60) Provisional application No. 63/610,857, filed on Dec. 15, 2023.

(51) Int. Cl.
| | |
|---|---|
| *B29B 13/02* | (2006.01) |
| *D01G 9/00* | (2006.01) |
| *D01G 13/00* | (2006.01) |
| *D04H 1/12* | (2006.01) |
| *D04H 1/42* | (2012.01) |
| *D04H 1/435* | (2012.01) |
| *D04H 1/4382* | (2012.01) |
| *D04H 1/541* | (2012.01) |
| *D04H 1/542* | (2012.01) |
| *D04H 1/55* | (2012.01) |
| *D04H 1/72* | (2012.01) |
| *E02B 3/10* | (2006.01) |

(52) U.S. Cl.
CPC ............ *E02B 3/106* (2013.01); *B29B 13/021* (2013.01); *D04H 1/435* (2013.01); *D04H 1/43825* (2020.05); *D04H 1/43835* (2020.05); *D04H 1/5418* (2020.05); *D04H 1/72* (2013.01); *D10B 2505/20* (2013.01); *D10B 2505/204* (2013.01)

(58) Field of Classification Search
CPC ........ B29B 13/02; B29B 13/021; D01G 9/00; D01G 13/00; D04H 1/12; D04H 1/42; D04H 1/435; D04H 1/43825; D04H 1/43835; D04H 1/541; D04H 1/5418; D04H 1/542; D04H 1/55; D10B 2505/20; D10B 2505/204
USPC ............... 264/121, 122, 126, 129, 517, 518; 425/80.1, 83.1; 19/145.5, 296, 304
See application file for complete search history.

(56) References Cited

U.S. PATENT DOCUMENTS

| | | | | |
|---|---|---|---|---|
| 6,422,787 B1 * | 7/2002 | Mikell | ................... | E02B 3/126 405/15 |
| 2013/0256940 A1 * | 10/2013 | Henderson | ............... | D21B 1/04 425/470 |
| 2018/0014568 A1 * | 1/2018 | Hernandez Garcia | ...................... | A24B 13/00 |

FOREIGN PATENT DOCUMENTS

| | | | | | |
|---|---|---|---|---|---|
| GB | 1394343 A | * | 5/1975 | ........... | B29B 13/021 |
| WO | WO-9100939 A1 | * | 1/1991 | ............. | E02B 3/126 |

* cited by examiner

Primary Examiner — Leo B Tentoni
(74) Attorney, Agent, or Firm — Fox Rothschild LLP

(57) ABSTRACT

A method of manufacturing a synthetic bale, including the steps of heating a mixture of a first plurality of fibers with a second plurality of fibers to cause the first plurality of fibers and the second plurality of fibers to thermally bond with one another to create bonded fibers, directing the bonded fibers into a forming chamber, and outputting the bonded fibers into a sheath configured for use as a synthetic ground-based bale.

21 Claims, 18 Drawing Sheets

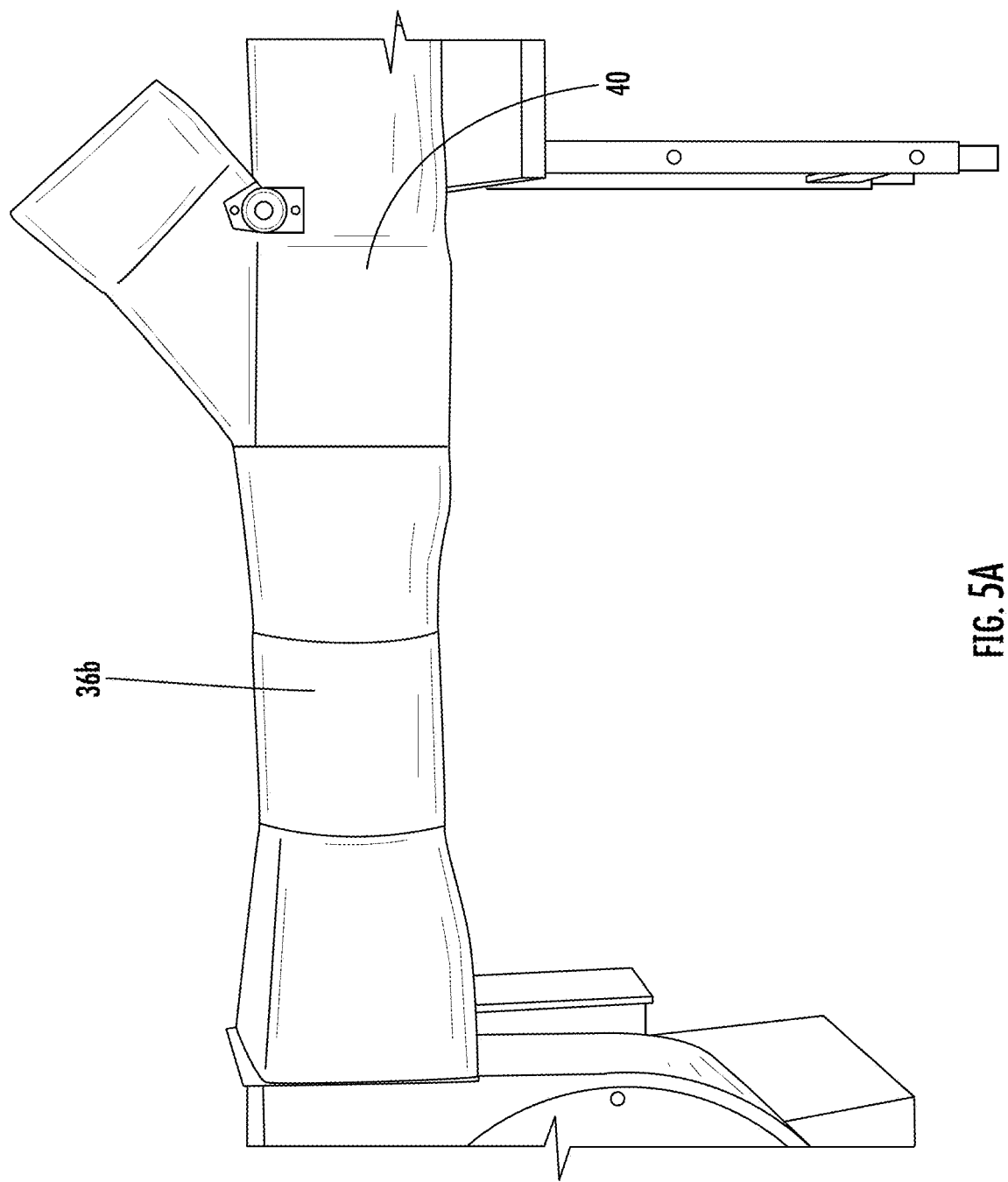

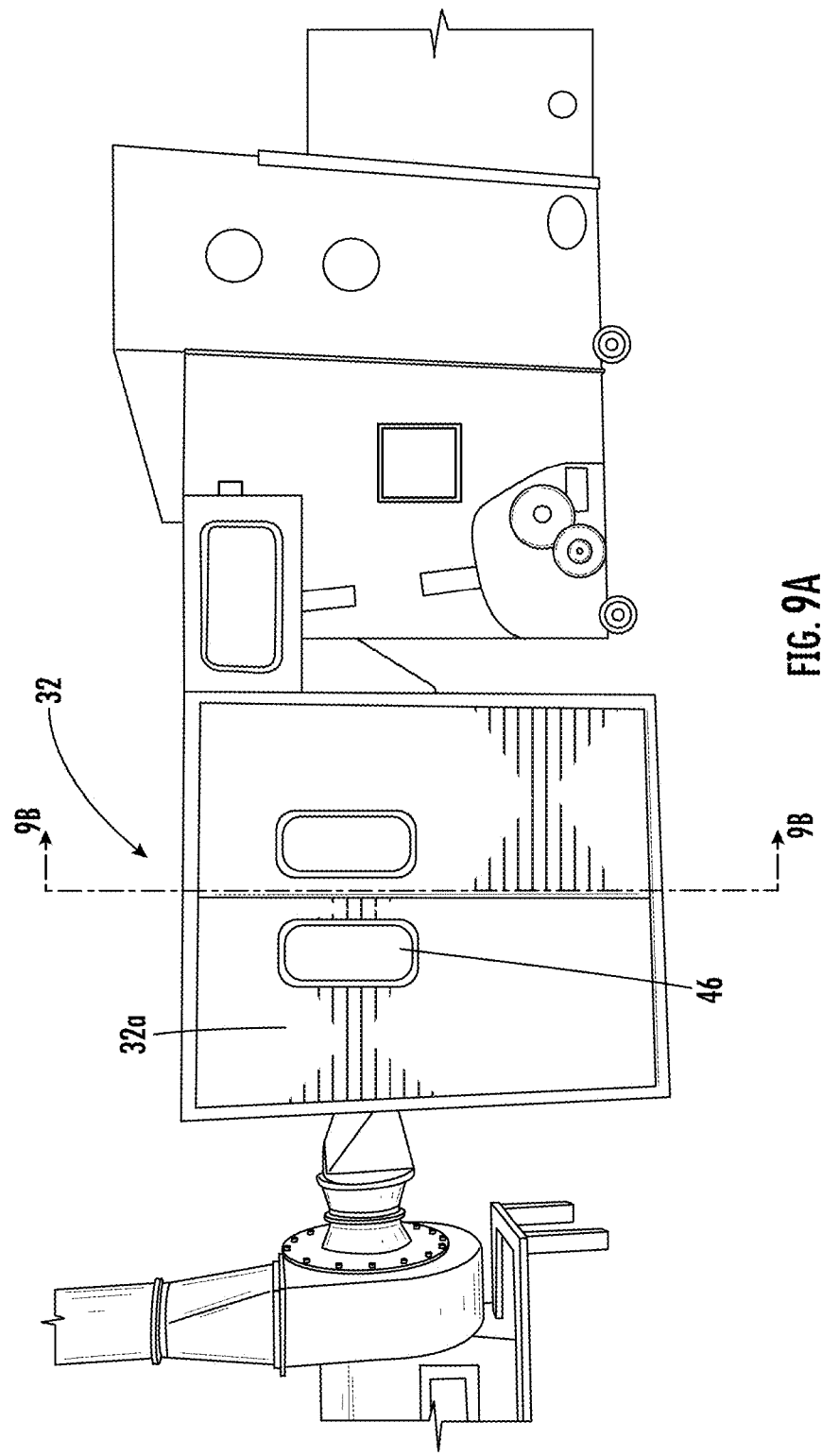

METHODS OF MANUFACTURING SYNTHETIC BALES

CROSS REFERENCE TO RELATED APPLICATION

This application claims priority to U.S. Provisional Application No. 63/610,857, filed on Dec. 15, 2023, and the entire contents of such provisional application is hereby incorporated by reference.

BACKGROUND

In many instances, it is desired to control the flow and boundaries of water using bales of straw and/or straw. Some instances include, for example, during construction for use as a boundary, after a storm, in various industrial applications, and in other environments, such as golf courses or pools where water is present. In some such applications, synthetic bales are used. Synthetic bales can be used as filter and remove dangerous heavy metals and hydrocarbons from water. For example, as water runs off during storms, in some cases it is important to remove heavy metals or hydrocarbons before the water reaches an end point such as a water filtration site. Previously, natural bales made of a material such as hay were used to control flow of water, however natural bales degrade over time and are less effective at filtration and flow control. Synthetic bales, such as the synthetic bale shown in U.S. Pat. No. 6,422,787, the entirety of which is incorporated herein by reference, have been used to control flow of water and filter water without drawbacks of natural hay bales. However, manufacturing synthetic bales can be cost and labor intensive.

Discussed herein are methods and systems designed to address at least some of the issues discussed above.

SUMMARY

The present disclosure relates to methods of manufacturing a synthetic bale. In some embodiments the method includes heating a mixture of a first plurality of fibers and a second plurality of fibers, thereby melting an outer portion of the second plurality of fibers to thermally bond the outer portion with the first plurality of fibers and creating a plurality of bonded fibers, directing the bonded fibers into a forming chamber, and outputting the bonded fibers into a sheath or casing configured for use as a ground-based bale.

In some embodiments, the method of manufacturing additionally includes converting the first plurality of fibers and the second plurality of fibers from a high-density configuration to a low-density configuration.

In some embodiments, the first plurality of fibers are synthetic fibers, and the second plurality of fibers are bicomponent fibers. In some embodiments, the second plurality of fibers have a lower melting point than the first plurality of fibers. In some embodiments, the synthetic fibers are polyester fibers.

In some embodiments, the first plurality of fibers and the second plurality of fibers are heated by blowing the first plurality of fibers and the second plurality of fibers through a conduit which is heated. In some embodiments, the conduit is heated between 260- and 270-degrees Fahrenheit.

In some embodiments, the first plurality of fibers and the second plurality of fibers are mixed with one another prior to being put into the pipe.

In some embodiments, the pipe is heated by a natural gas burner.

In some embodiments, the first plurality of fibers are 10-25% and the second plurality of fibers are 75-90% by weight, respectively, of mixture of the first and second pluralities of fibers.

In some embodiments, the bonded fibers are randomly oriented within the sheath. In some embodiments, the sheath is painted. In some other embodiments, the sheath is water permeable and is configured for use as a ground-based bale.

In some embodiments, the bonded fibers are output into the sheath by a pneumatic diverter. In some embodiments, the pneumatic diverter is pneumatically movable between a flow diverting position and a non-flow diverting position. In some embodiments, the bonded fibers are configured to flow through the diverter into a sheath when the pneumatic diverter is in the non-flow diverting position and hot air is configured to flow out of an exhaust when the pneumatic diverter is in the flow diverting position.

In some embodiments, the first and second plurality of fibers are in a hopper operably connected to a conduit a having heated air flowing therethrough prior to heating the first and second plurality of fibers.

The present disclosure additionally relates to a system for manufacturing a synthetic bale within a sheath from a first plurality of fibers and a second plurality of fibers. The system includes a heater configured for heating a mixture of the first plurality of fibers with the second plurality of fibers. The outer portions of the second plurality of fibers are melted by the heater sufficiently to bond the outer portion with the first plurality of fibers to thereby create a plurality of bonded fibers. The system additionally includes a chamber and a blower configured for directing the bonded fibers into the chamber. The system additionally includes means for outputting the bonded fibers into the sheath.

In some embodiments, the system includes an opener configured to convert the first plurality of fibers and the second plurality of fibers from a high-density configuration to a low-density configuration, wherein the opener is operably connected to the heater and the first plurality of fibers, and the second plurality of fibers are provided to the heater in the low density configuration.

In some embodiments, the system includes a mixer configured to mix the first plurality of fibers and the second plurality of fibers, wherein the mixer is operably connected to the chamber and the mixer is configured to mix the first plurality of fibers and the second plurality of fibers prior to the first plurality of fibers and the second plurality of fibers entering the chamber.

BRIEF DESCRIPTION OF THE DRAWINGS

FIG. 5A is a partial side elevational image of a conduit attached to a diverter in accordance with the principles of the present disclosure.

FIG. 9A is a partial side elevational view of a mixer for blending fibers in accordance with the principles of the present disclosure.

In the drawings, like reference numbers indicate identical or similar elements.

DETAILED DESCRIPTION

Figure 1:
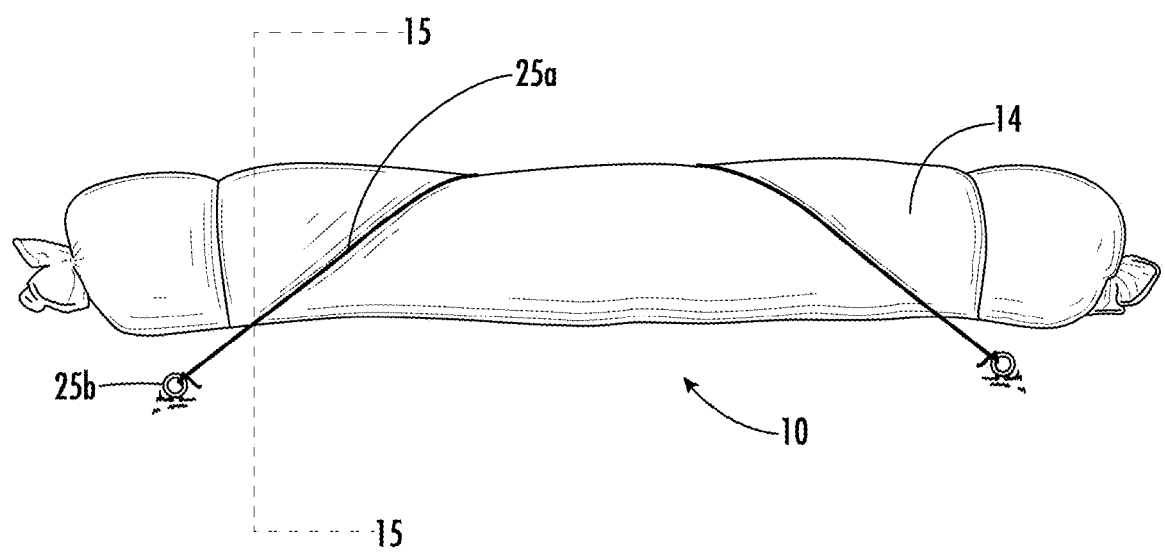
FIG. 1 is a side elevational view of a synthetic bale in accordance with the principles of the present disclosure.

Utilizing the methods discussed herein, a cost effective and labor efficient method of manufacturing of a synthetic bale can be achieved. Additionally, the synthetic bale discussed herein is of enhanced rigidity and therefore has better shape retention as compared to synthetic bales of the prior art. FIG. 1 depicts a synthetic bale 10 in accordance with the principals of the present disclosure. The synthetic bale 10 includes an outer sheath 14 and contains a plurality of individual bonded fibers within (not shown here). The sheath 14 and the bonded fibers cooperate and allow a reduced amount of water to flow therethrough.

Figure 2:
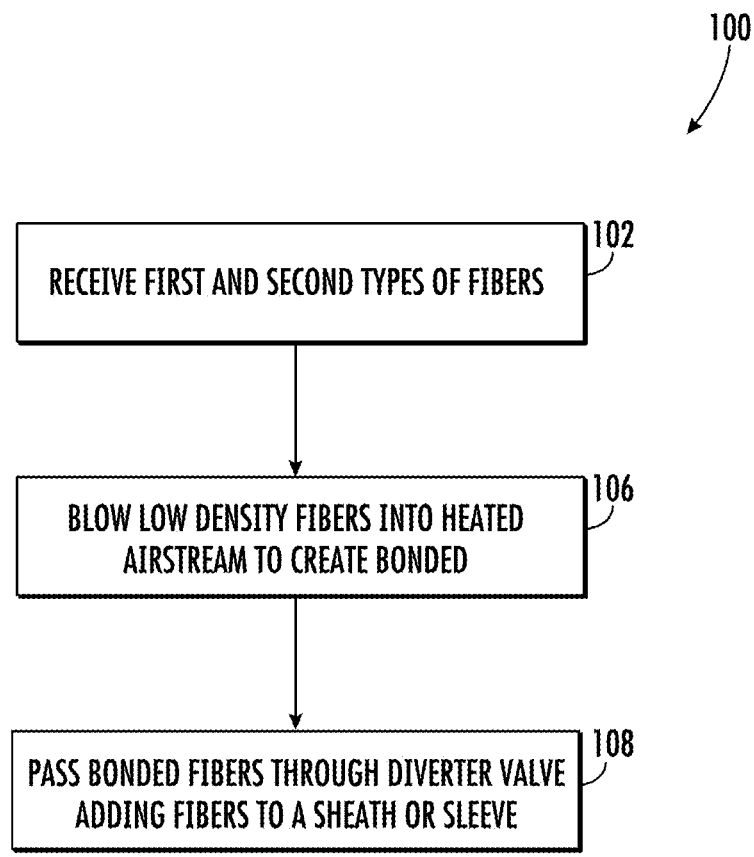
FIG. 2 is a flow chart outlining a method of manufacturing the synthetic bale of FIG. 1.

FIG. 2 depicts a flow chart 100 outlining an example of manufacturing a synthetic bale in accordance with the principles of the present disclosure such as the synthetic bale 10 of FIG. 1. The flow chart includes a first step 102 of receiving first and second types of fibers. In some examples, the fibers that are received are in a high-density configuration. Optionally, if the fibers are received in a high-density configuration, they are opened to be converted to a low-density configuration discussed in further detail below. At a second step 106, the low-density fibers are blown into a heated airstream to bond the fibers with one another. Typically, the fibers have different melting points, facilitating the fibers to be combined with one another to yield a fiber mixture having different characteristics as compared to the individual characteristics of the input fibers, i.e., the fiber mixture is a pliable, absorbent mixture/configuration. At a third step 108 the bonded fibers are put into a sheath or sleeve, thereby creating a synthetic bale in accordance with the principles of the present disclosure.

Figure 3:
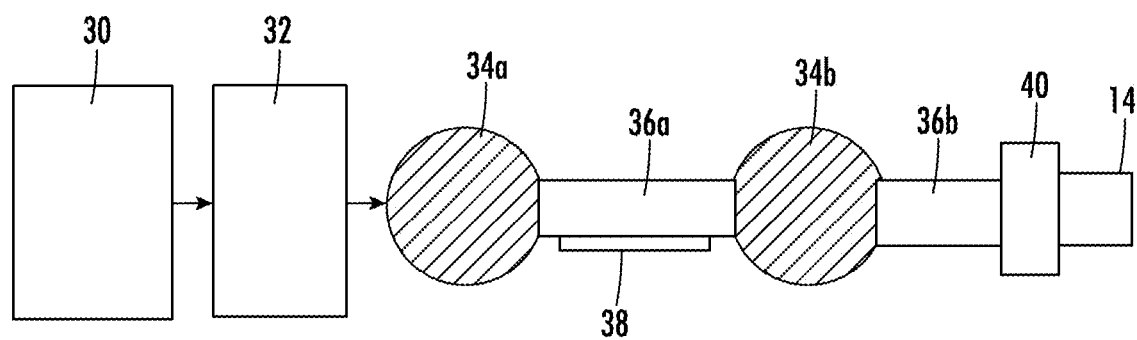
FIG. 3 is a schematic view of the method of manufacturing the synthetic bale of FIG. 1.

FIG. 3 is a schematic representation of the method of FIG. 2. FIG. 3 depicts additionally depicts an opener 30. The opener 30 is configured to be fed a bale of high-density fibers and convert the high-density of fibers into a low-density of fibers.

Figure 7:
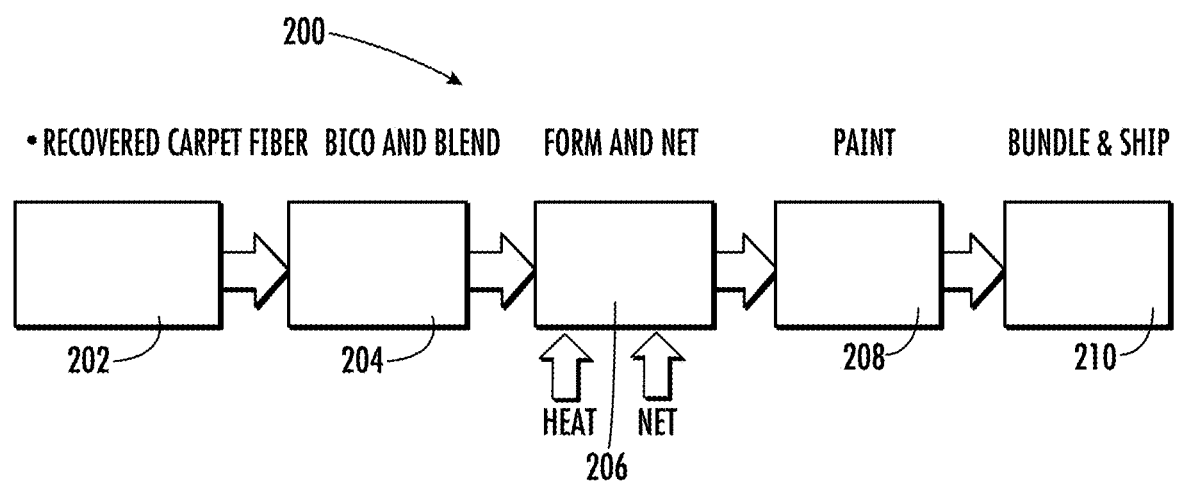
FIG. 7 is a flow chart outlining an alternative method of manufacturing the synthetic bale of FIG. 1.

In some embodiments, a first and a second type of fiber can be pre-mixed with one another and in a high-density configuration which is converted to a low-density configuration, e.g., by an opener. In this way, when converted from high to low density, the first and second types of fibers are pre-blended. In some other embodiments, as discussed below, different first and second types of fibers are converted from high-density to low-density and then blended with one another. In other examples, the first and second types of fibers in a low-density configuration are blended with one another and are not required to be opened. In one example, as depicted in FIG. 7, the first and second types of low-density fibers may be blended with one another in a mixer 32 (discussed in further detail below). Any other suitable configuration allowing for the first and second fibers blended with one another is additionally possible.

The blended fibers may be blown using a blower, or fan 34a into a pipe 36a. The pipe 36a is heated by a heater 38 creating a heated airstream which the fibers flow through. The heat of the heated airstream created by the fan 34a and heater 38 thermally bonds the fibers with one another creating bonded fibers. Typically, at least one of the types of the fibers has a low-melt temperature and the other type of fiber has a high-melt temperature. The high-melt temperature fibers and the low melt temperature fibers are bonded with one another when heated. In some embodiments, one type of fiber has a low-melt temperature outer portion and a high-melt temperature inner portion so only the outer portion melts when heated. One example is a bi-component ("BI-CO") fiber as discussed herein. In some examples: the low-melt temperature has a melting temperature typically between about 200 degrees Fahrenheit to about 250 degrees Fahrenheit, about 250 degrees to about 300 degrees Fahrenheit, about 300 degrees to about 350 degrees Fahrenheit, or about 350 to about 400 degrees Fahrenheit or any other suitable range of temperatures. In some embodiments, the high melt fibers have a melting temperature between about 450 degrees to about 500 degrees Fahrenheit, about 500 to about 550 degrees Fahrenheit, about 550 to about 600 degrees Fahrenheit or any other suitable range of temperatures. It will be appreciated that if both fibers had a similar melting temperature, the fibers either would not melt at all or would melt too much resulting in a solid block of fibers or overly dense fibers.

In some embodiments, once the fibers are bonded, the bonded fibers may be blown using a second fan 34b into a second pipe 36b which is attached to a diverter 40. Upon actuation of diverter 40, the bonded fibers are output from the diverter into a sheath 14 thereby creating a synthetic bale encased in a sheath. The heater is configured to provide enough heat to bond the fibers without the fibers becoming overly melted, which could result in a bale that would not allow water to pass therethrough.

Figure 4:
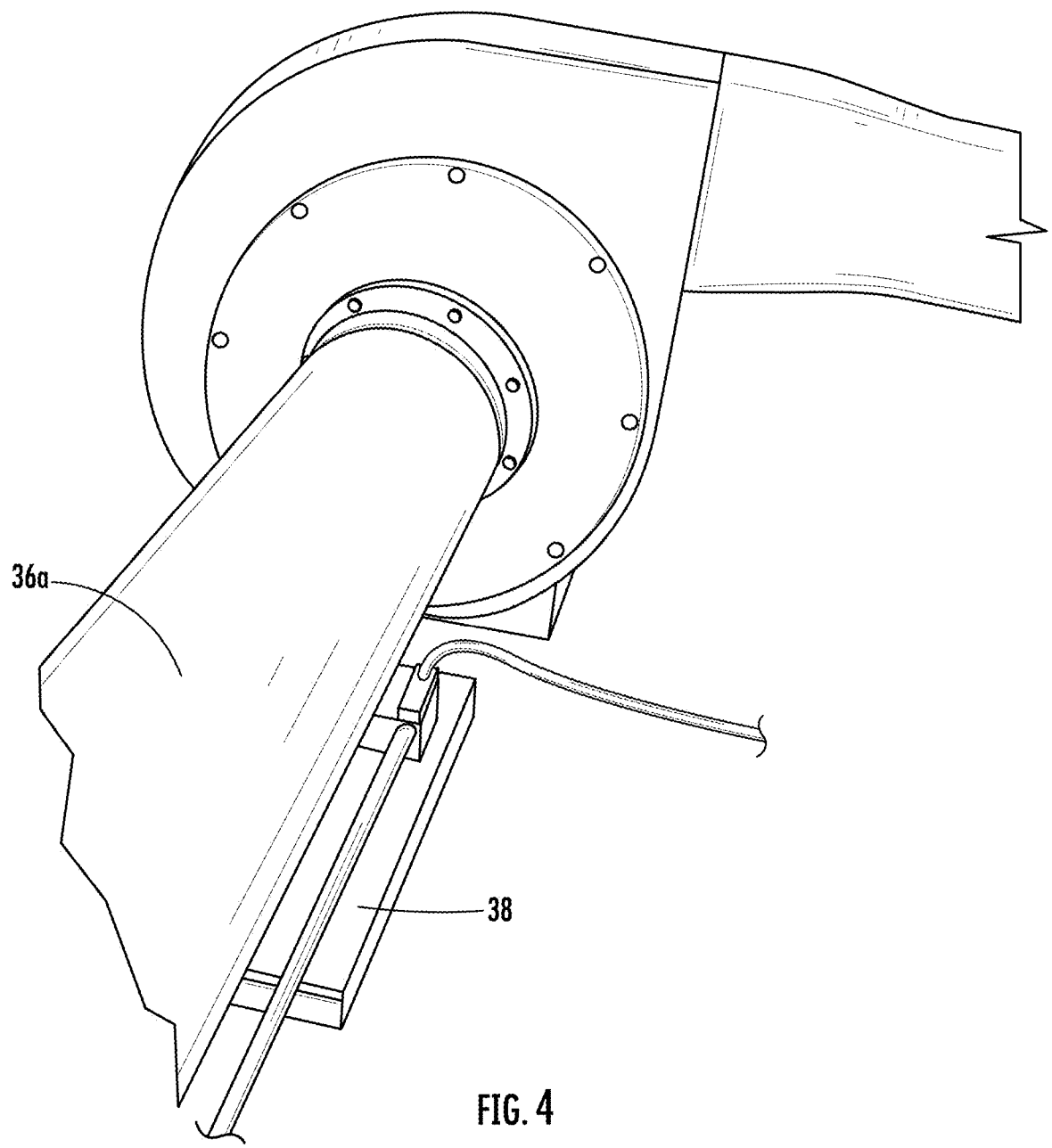
FIG. 4 is a partial perspective view of a fiber flow conduit and a heater for bonding fibers with one another in accordance with the principles of the present disclosure.
Figure 5B:
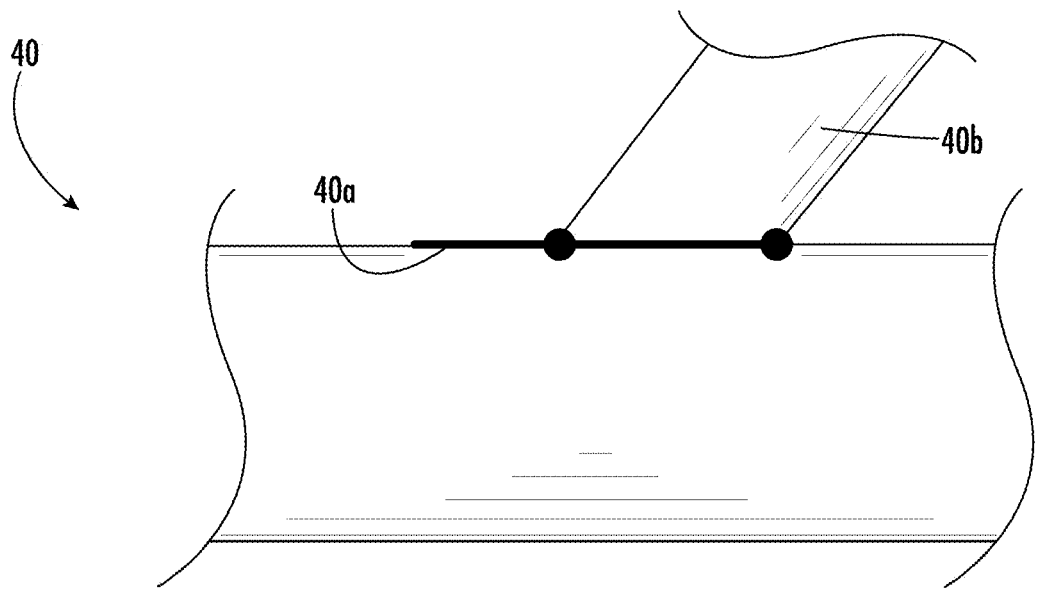
FIG. 5B is a schematic view of the conduit of FIG. 5A illustrating the diverter in a position for not diverting flow thought the conduit.
Figure 5C:
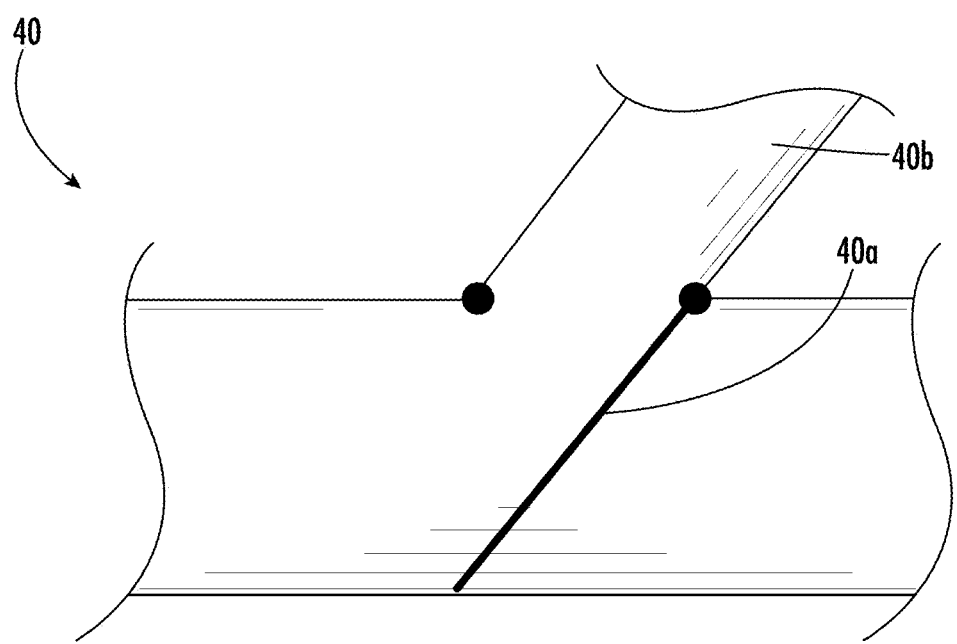
FIG. 5C is a schematic view of the conduit of FIG. 5A illustrating the diverter in a position for diverting flow thought the conduit.
Figure 6:
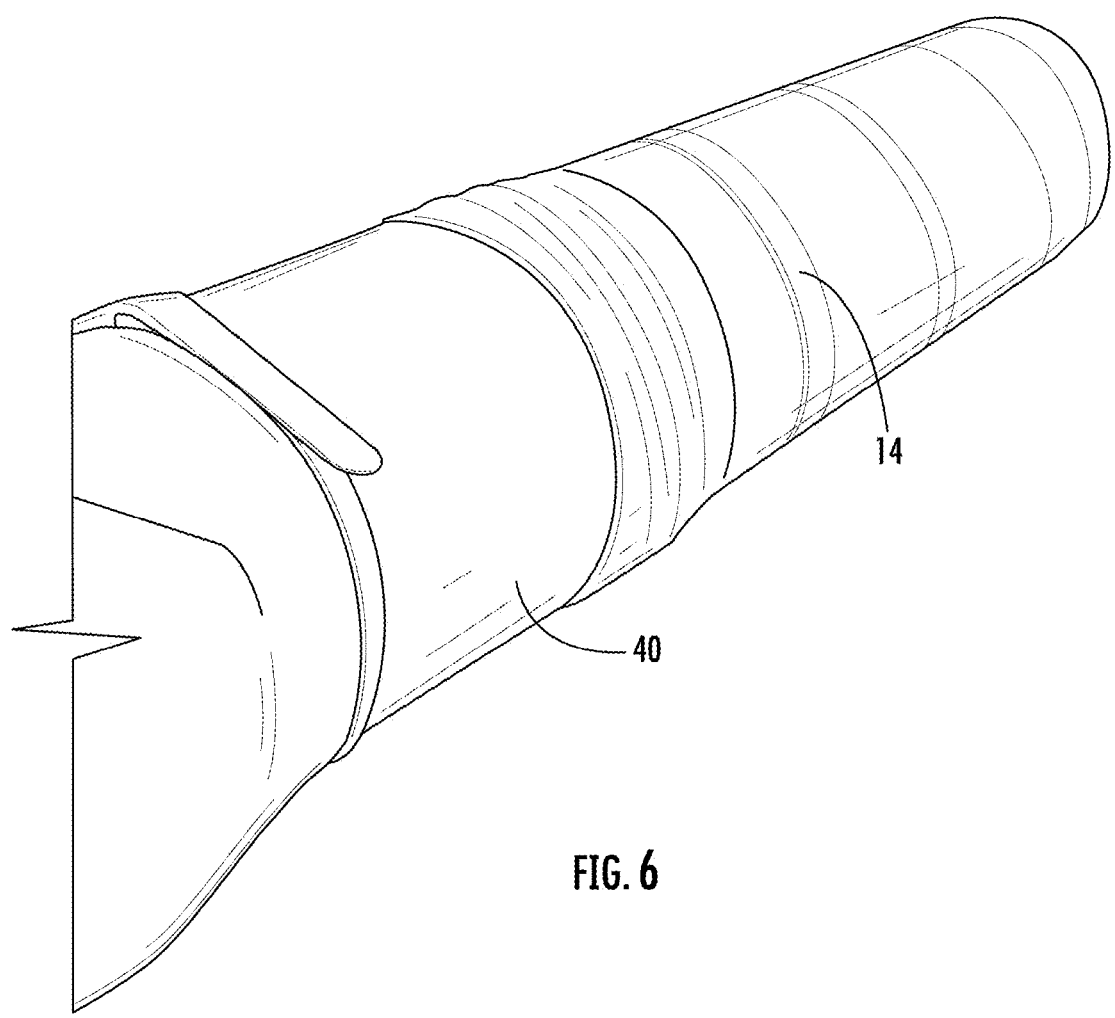
FIG. 6 is a partial perspective view of a diverter attached to a casing, or sheath, in accordance with the principles of the present disclosure.

FIGS. 4-6 provide further details for the method of FIG. 2. FIG. 4 shows an elongated pipe 36a. A blend of a low density first and second type of fibers are provided to the pipe. In some embodiments, the first type of fibers 42 are synthetic fibers 42 which have a high-melt temperature as discussed above and the second type of fibers 44 are bicomponent fibers 44 which are the low-melt temperature fibers. Bicomponent, or BI-CO, fibers typically have a low-melt temperature outer sleeve, and a high-melt temperature inner portion as discussed above. It will be appreciated that other low-melt temperature fibers and other high-melt temperature fibers can additionally be used. Typically, the blend includes 15-20% low-melt temperature fibers, 20-25% low-melt temperature fibers, and the remaining fibers are high-melt temperature fibers or any other suitable percentage of fibers. It will be appreciated that other combinations of fibers are additionally possible. The blend of synthetic fibers 42 and bicomponent fibers 46 are blown and flow through the elongated pipe 36a via a fan at a relatively high speed. In some examples, this takes place after the fibers have been opened and converted from a high-density configuration to a low-density configuration. In other examples, the fibers are pre-blended, in other examples, the fibers are opened and pre-blended and introduced directly to the airstream within the pipe 36a.

As the blend of synthetic fibers and bicomponent fibers 46 flow through the elongated pipe 36a, they are heated by a heater 38 at a relatively high heat. The blend of synthetic fibers and bicomponent fibers 46 thermally bond with one another as they pass through the elongated pipe creating bonded fibers 50. As discussed above, the bicomponent fibers 44 are the low melt temperature fibers and have a lower melting point than the synthetic fibers 42. An outer sheath of the bicomponent fibers 44 and the temperature of the synthetic fibers 42 are brought to a temperature wherein the fibers 42 and 44 bond with one another creating bonded fibers 50. In some embodiments, the outer sheath of the bicomponent fibers melts and bonds to the synthetic fibers. It will be appreciated that other low and high melt temperature fibers can be used with one another if they have parameters which allow for an outer sheath of the high melt temperature fiber to bond with the low melt temperature fiber. In some embodiments, the heater 38 is a cobalt burner, in other embodiments, the heater is any heater capable of producing enough heat through the pipe 36a to melt and bond the fibers with one another.

After the blend of synthetic and bicomponent fibers are bonded with one another, the bonded fibers are blown into a pipe 36b (FIG. 5A) which is attached to the diverter 40. In the depicted embodiment, the diverter 40 is attached to a sheath 14. In some embodiments, the diverter 40 is a pneumatically actuated diverter which can selectively allow the start of flow of the bonded fibers into the sheath 14. FIGS. 5B and 5C depict the diverter 40 in open and closed positions respectively. It will be appreciated that in a closed, flow diverting position, the diverter includes a diverter door 40a extends from a first side of the diverter to a second side of the diverter to prevent fibers from flowing through the pipe. It will be appreciated that in an open, non-flow diverting configuration, the diverter door 40a is parallel to a side of the pipe thereby allowing the fibers to pass through the pipe. In some examples, the diverter 40 is configured to divert airflow into a secondary pipe 40b when in the closed position. In some examples (e.g., see exhaust 344 in FIG. 11) the secondary pipe is an exhaust which exhausts hot air out of the area which the process of creating synthetic bales is taking place.

The sheath 14 is depicted as attached to the diverter in FIG. 6. In some embodiments, the sheath 14 is a sleeve which can contain bonded fibers for use in a plurality of synthetic bales. In some embodiments, the sheath 14 is a synthetic sock for a single synthetic bale. In some embodiments, the synthetic sock is made from a polyester material. In some embodiments, the synthetic sock is 150 denier polyester. In other embodiments the synthetic sock is a chemical resistant polyester, a chemical resistant polypropylene, and the sleeve may be, by way of a non-limiting example, a Carriff Engineered Fabrics Corporation sleeve.

Optionally, after the bonded fibers are blown into the synthetic sock, synthetic sock is closed or sealed in a suitable manner to prevent the fibers from escaping the synthetic sock. Once sealed, the bale is thus formed and ready for shipment. Optionally, prior to bundling, the synthetic sock may be painted for aesthetic purposes or alternatively for functional purposes such as to increase or decrease the filtration of fluid. It will be appreciated that the bale is more rigid than a typical synthetic bale due to the blend of high and low temperature fibers. The blend of high and low temperature fibers allows for a rigidity allowing the synthetic bale to retain its shape but still allow for fluid to flow through the bale.

FIG. 7 depicts a flow chart 200 outlining an alternative method of manufacturing the synthetic bale 10 of FIG. 1. The flow chart 200 includes a first step 202 of receiving fibers. The fibers may be recovered or recycled fibers, discussed in further detail below. Additionally, and/or alternatively, the received fibers are first in a high-density configuration and then opened to be in a low-density configuration as discussed in further detail below. Next in the flow chart 200, a second step 204 of mixing first fibers with second fibers occurs. At a third step 206, the fibers are heated and put into a sheath. At a fourth step 208 the sheath is optionally painted, and finally at a fifth step 210 a synthetic bale, in accordance with the principles of the present disclosure, is created, bundled, and prepared for shipping.

Figure 8:
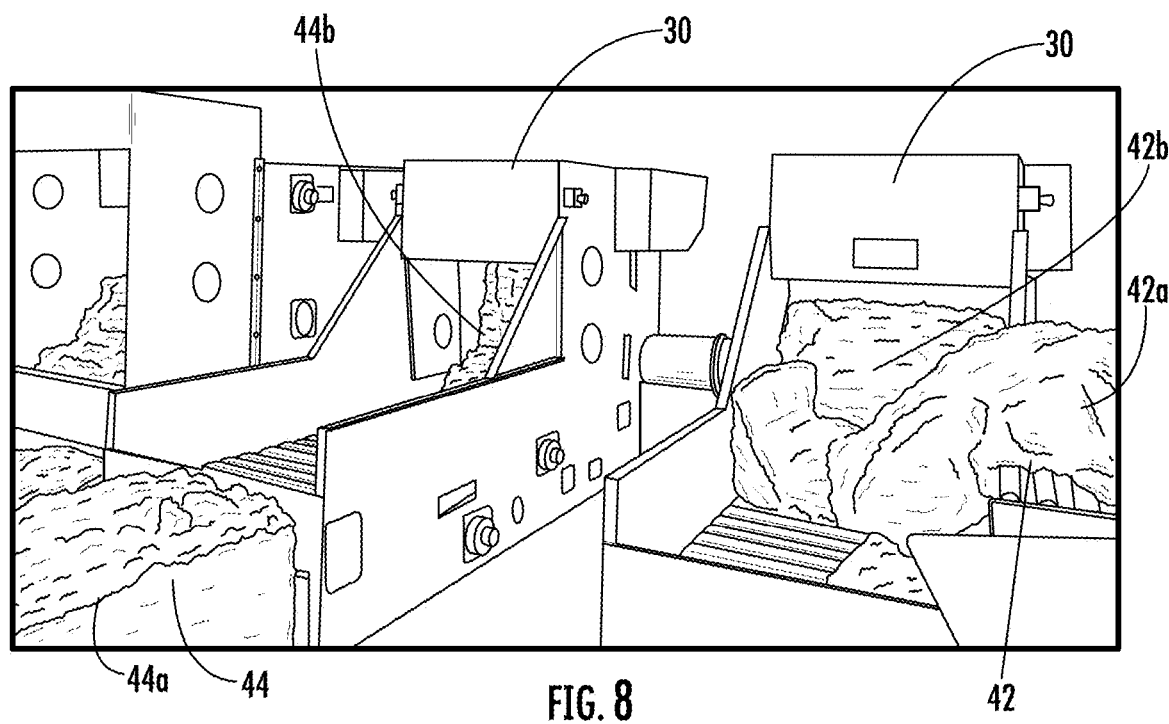
FIG. 8 is a partial perspective view of a fiber opener, the fiber opener being depicted as converting fibers from being high-density to being low-density in accordance with the principles of the present disclosure.

FIG. 8 shows the opener 30 in more detail. In this embodiment, there are a first type of fibers 42 and a second type of fibers 44. In the depicted embodiment, the first type of fibers 42 are synthetic fibers 42 and the second type of fibers 44 are bicomponent fibers 44. The synthetic fibers 42 are shown as compressed, or high-density, synthetic fibers 42a prior to being added to the opener 30 and converted to relatively less compressed, or low-density, synthetic fibers 42b after being processed by the opener 30. Similarly, the bicomponent fibers 44 are shown as high-density bicomponent fibers 44a prior to being added to the opener 30 and as low-density bicomponent fibers 44b after being added to the opener. In some embodiments, the synthetic fibers 42 are recovered from recycled fabric. In some embodiments, the recycled fabric is recycled carpet.

Figure 9B:
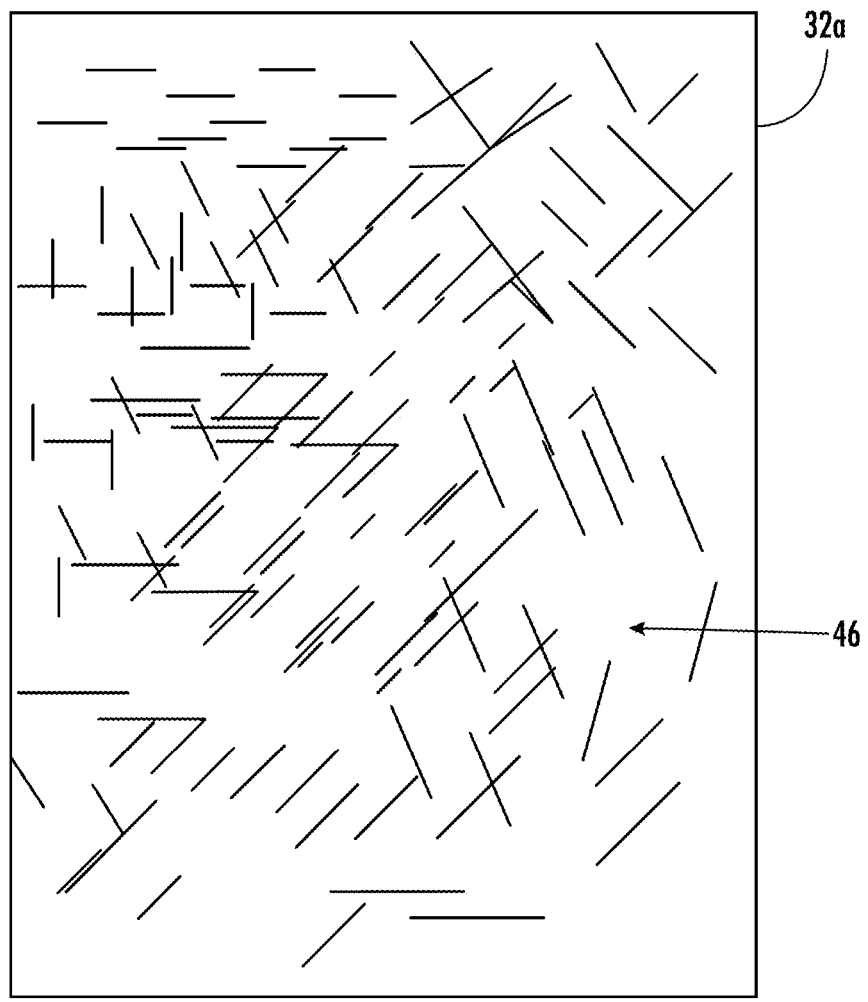
FIG. 9B is a schematic cross-sectional view of the mixer of FIG. 9A at section 9B-9B.

In this example embodiment, after the high-density synthetic fibers 42a and the high-density bicomponent fibers 44a have been converted from high-density to low-density, the low-density bicomponent and synthetic fibers 42b, 44b are added to a mixer 32. An example mixer 32 is depicted in FIG. 9A. The low-density synthetic and bicomponent fibers 42a, 44a are mixed within a chamber 32a (FIG. 9B) of the mixer 32. Once mixed, a blend of synthetic and bicomponent fibers 46 are formed. In some embodiments, the blended fibers are about 80-90% by weight synthetic fibers 42 and about 10-20% percent by weight bicomponent fibers 44.

It will be appreciated that after the fibers have been blended with one another in the mixer, a similar process as to the process outlined above (e.g., as in FIGS. 4-6) can be performed on the blended fibers to create a synthetic bale like the synthetic bale 10 of FIG. 1.

In other embodiments, for example, in the method depicted in FIG. 2, only one opener 30 is required as the first type of fibers and the second type of fibers are pre-mixed in the high-density configuration.

FIGS. 10-14 depict an alternate implementation, system 300, in accordance with the principles of the present disclosure for creating synthetic bales, for example the synthetic bale 10 of FIG. 1. The system includes a hopper 320 for containing fibers, for example a mixture of bi-component fibers and synthetic fibers, or any other high-melt temperature and low-melt temperature fibers. The hopper 320 is operably connected to a pipe 336. The pipe 336 includes a branch 336a connecting the pipe to a heater 338 providing a heated air stream through the pipe 336. The pipe 336 is depicted as a cylindrical pipe having a heat-resistant covering. In some embodiments, the pipe has a different shape such as rectangular, oval or any other suitable shape. The pipe 336 is additionally operably attached to a blower 340, configured to pull fibers through the pipe 336 and push the fibers through a diverter 342. It will be appreciated that the pipe 336 may be connected to additional blowers. It will also be appreciated that the heater provides some heated air to the pipe by blowing heated air through the branch 336a. The diverter 342 is connected to an exhaust 344 for exhausting hot air and an output 346 configured to receive fibers that have been heated and bonded.

Figure 10:
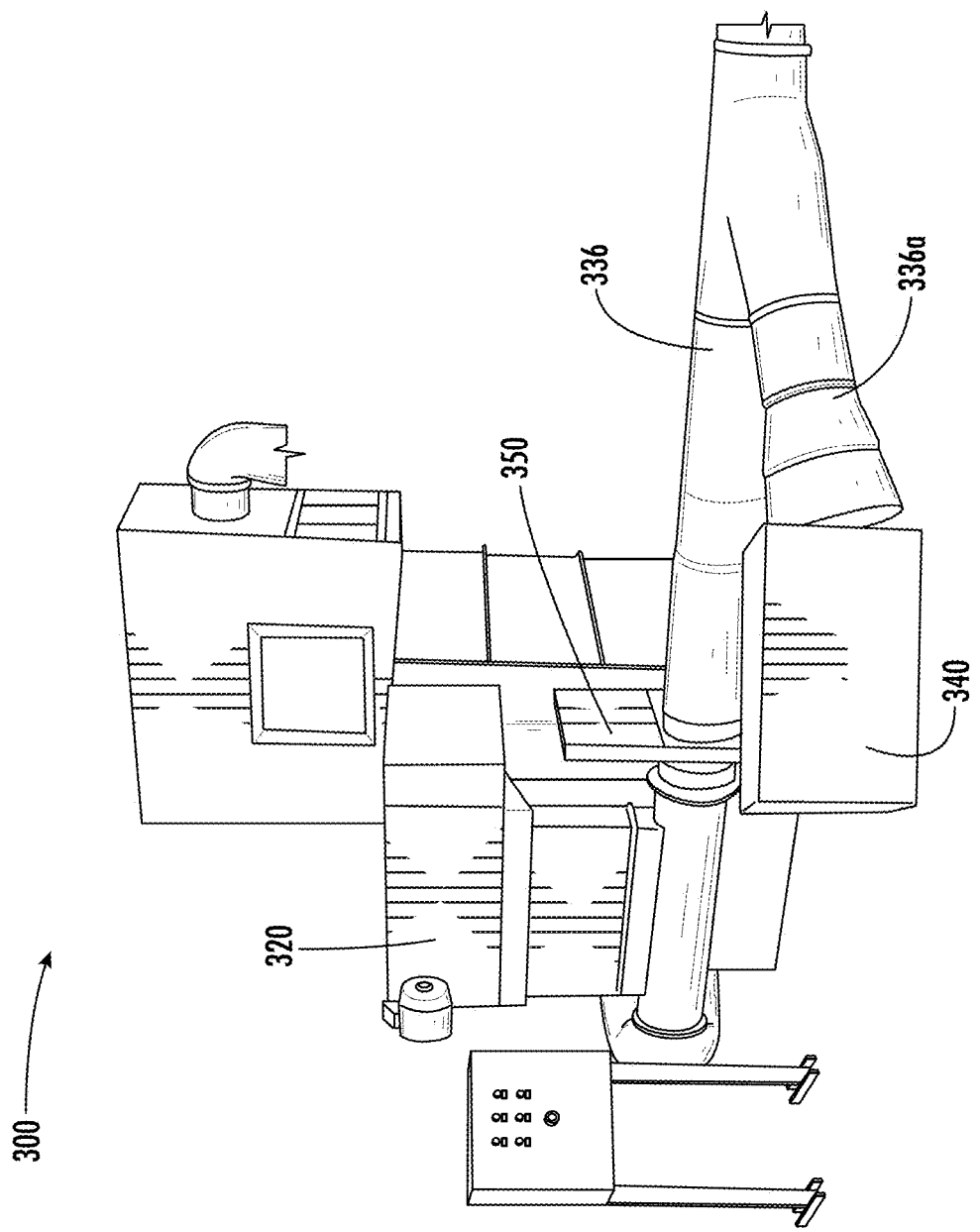
FIG. 10 is a partial perspective view of a system for creating synthetic bales in accordance with the principles of the present disclosure.

Referring to FIG. 10, the hopper 320 is shown. The hopper is attached to the pipe 336 at a blast gate 350 configured to open, allowing fibers to flow into the pipe 336 and close, preventing fibers from flowing into the pipe 336. In some embodiments, the blast gate 350 is operably connected to a control which allows an operator to open or close the blast gate 350. In some embodiments, the control is additionally connected to the diverter 342 which can be used to divert hot air therethrough into the exhaust after the blast gate 350 is closed. It will be appreciated that the diverter functions similarly to the diverter 342 as shown in FIGS. 5A-5C. In some embodiments, the blast gate 350 is configured to close and the diverter is configured to divert hot air through the exhaust on a delay. For example, a user can close the blast gate 350 and after a predetermined amount of time, typically correlated to the amount of time required for fibers to pass entirely through the pipe 336 to prevent any fibers from passing through the exhaust. In some examples, the diverter diverts air through the exhaust approximately 4 seconds, 5 seconds, 6 seconds, 7 seconds, 8 seconds, or any other suitable amount of time after the blast gate closed.

The heater 338 is configured to provide sufficient heat into the conduit, or pipe, 336 to melt at least the exterior layer of bicomponent fibers to bond the bicomponent fibers with the synthetic fibers or any other low-temperature fibers with high-melt temperature fibers. In some embodiments, the heater is a natural gas heater. In some embodiments, the heater is a gas-fired heater. In some examples the gas is natural gas, in other examples, the gas is butane, propane, methane, or any other suitable gas. It will be appreciated that the heater 338 includes a blower or fan which propels heated air into the pipe 336 through the branch 336a. In other examples, heat is drawn from the heater 338 into the pipe 336 through the branch 336a by the blower 340.

Figure 11:
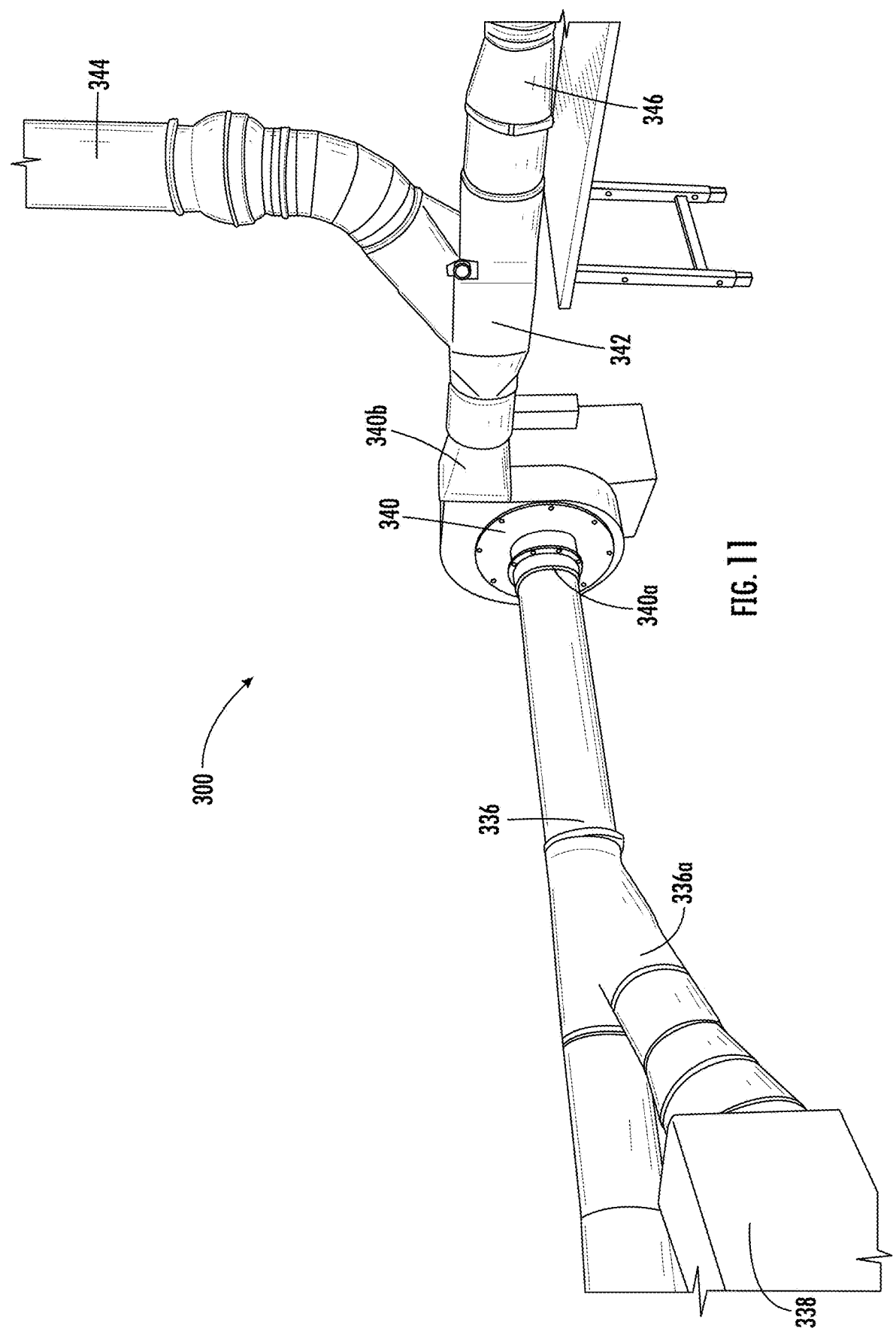
FIG. 11 is a partial perspective view of a portion of the system of FIG. 10, including a heater, blower, and diverter.
Figure 12:
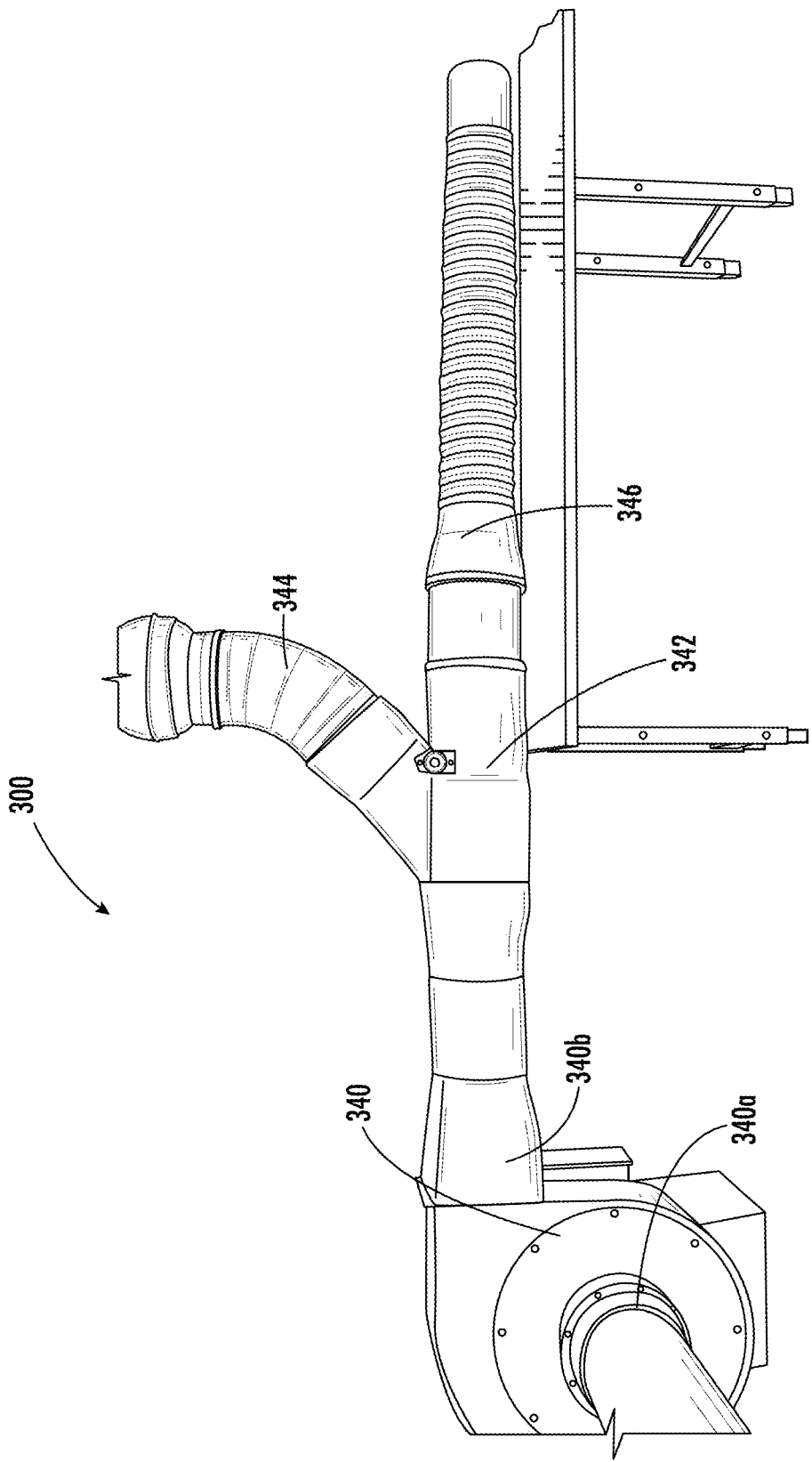
FIG. 12 is a partial side elevational view of a portion of the system of FIG. 10, including the blower, diverter, exhaust and an output.

Referring to FIGS. 11 and 12, the pipe 336 is depicted as being attached to the blower 340 downstream of the heater 338. The blower is attached to the pipe 336 at an inlet 340a and the diverter 342 at an outlet 340b. In this manner, heated fibers and bonded are propelled through the pipe 336 through the inlet 340a and out of the outlet 340b into the diverter 342. As discussed above, the diverter functions similarly to the diverter 40 as depicted in FIGS. 5A-5C. In an open configuration, fibers are diverted into the output 346 and configured to be blown into a synthetic sock (e.g., the sheath 14 as discussed above), and in the closed direction air, after the blast gate has been closed for a predetermined amount of time above, is exhausted through the exhaust directing heated air out of the system 300. For example, if the system is set-up in a warehouse or other structure, the exhaust can direct such air out from the warehouse.

Figure 13:
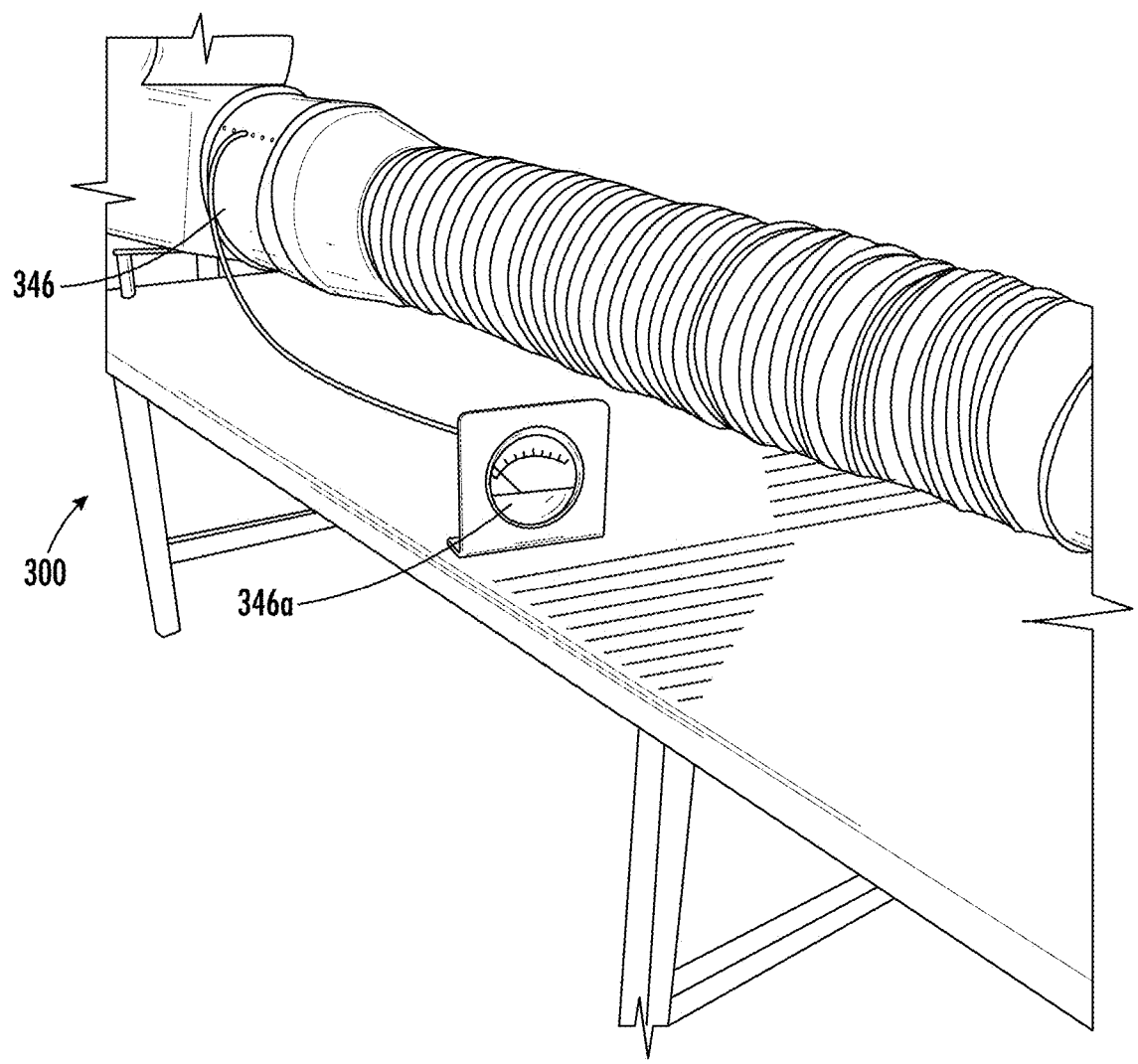
FIG. 13 is a partial perspective view of the system of FIG. 10, including the output and a gauge for measuring pressure at the output.

FIG. 13 depicts a sheath (e.g., the sheath 14) extending around the output 346. It will be appreciated that in the depicted configuration, an end of the synthetic sock can be positioned in front of the output 346 to allow fibers to flow from the output 346 into the sheath 14. It will be appreciated that the sheath 14 is bunched around the output and then can be pulled over the output 346 and closed allowing the sheath 14 to be filled with the fibers. In some examples, the sheath 14 is closed or sealed with a clip. In some examples, the sock is closed or sealed by a hog ring, a C ring, a D ring, or any other suitable fastener.

Figure 14:
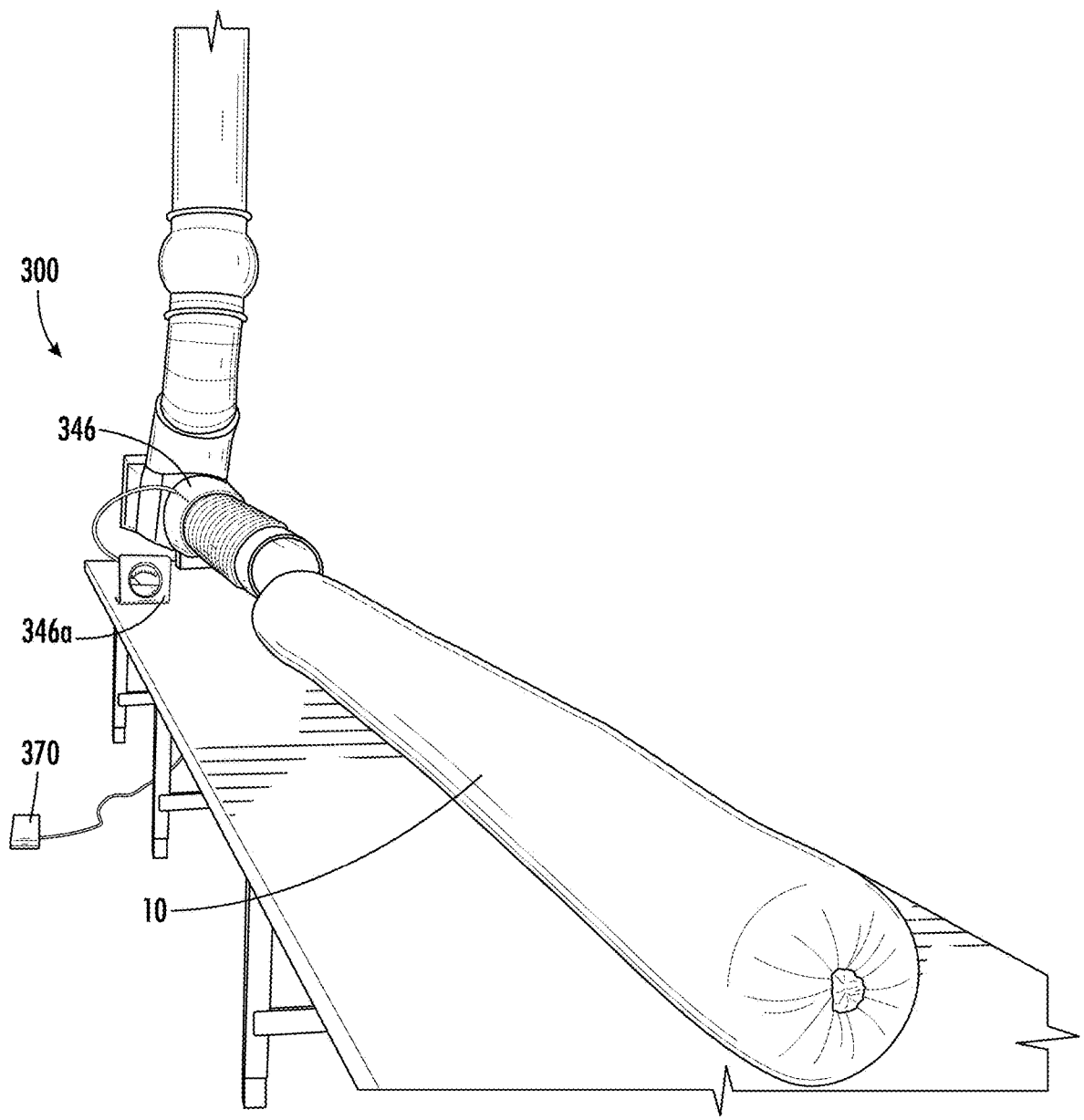
FIG. 14 is a partial perspective view of FIG. 10, including the output and a completed synthetic bale.

As shown in FIG. 13, the output 346 includes a gauge 346a, for example, a pressure gauge or other type of gauge. In some embodiments, the gauge 346a is a Magnehelic gauge which measures a pressure differential between two points on different sides of a diaphragm. In other examples, the gauge 346a can be a photohelic gauge or any other suitable sensor or gauge. The gauges allow a user to determine the amount that the sheath 14 has been stuffed with fibers, for example, once the Magnehelic gauge reaches a specific pressure, the additional length of the sheath 14 can be moved from the exterior of the output 346 which in some examples is done manually or through automation. In some examples, the pressure sensor is used to determine the weight of fibers per foot (e.g., density) that are blown into the sock and the operator moves the bale as it is filled to the desired amount until the bale is filled to the desired length. It will be appreciated that the pressure can be different depending on the desired size of the final synthetic bale. For example, if a greater diameter is desired, a higher predetermined pressure may be used. In some embodiments, the predetermined pressure is about 0 to 2 pounds per foot, about 2 to 3 pounds per foot, about 3 to 4 pounds per foot or any other suitable pressure. Once filled and the desired length is achieved, a second clip (e.g., a similar clip to the clip discussed above) can be used to close or seal the sheath 14, thereby creating a synthetic bale. FIG. 14 depicts a completed synthetic bale 10 similar to the synthetic bale 10 of FIG. 1.

In some examples, the system 300 can be user operated via a control 370. The control 370 is depicted in FIG. 14 as a pedal. As depicted, the pedal is configured to be pressed and open the blast gate 350 and diverter 342 such that fibers are sent through the system 300 as discussed above, and bonded fibers are sent through the output 346. The system 300 is configured to be operated by a single operator. After the bale 10 has been filled to the desired fill and length, the operator can press the pedal again to stop the system. The pedal will cause the blast gate 350 to close and the diverter 342 to move to the closed position after all fibers have been completely sent through the output 346.

Figure 15:
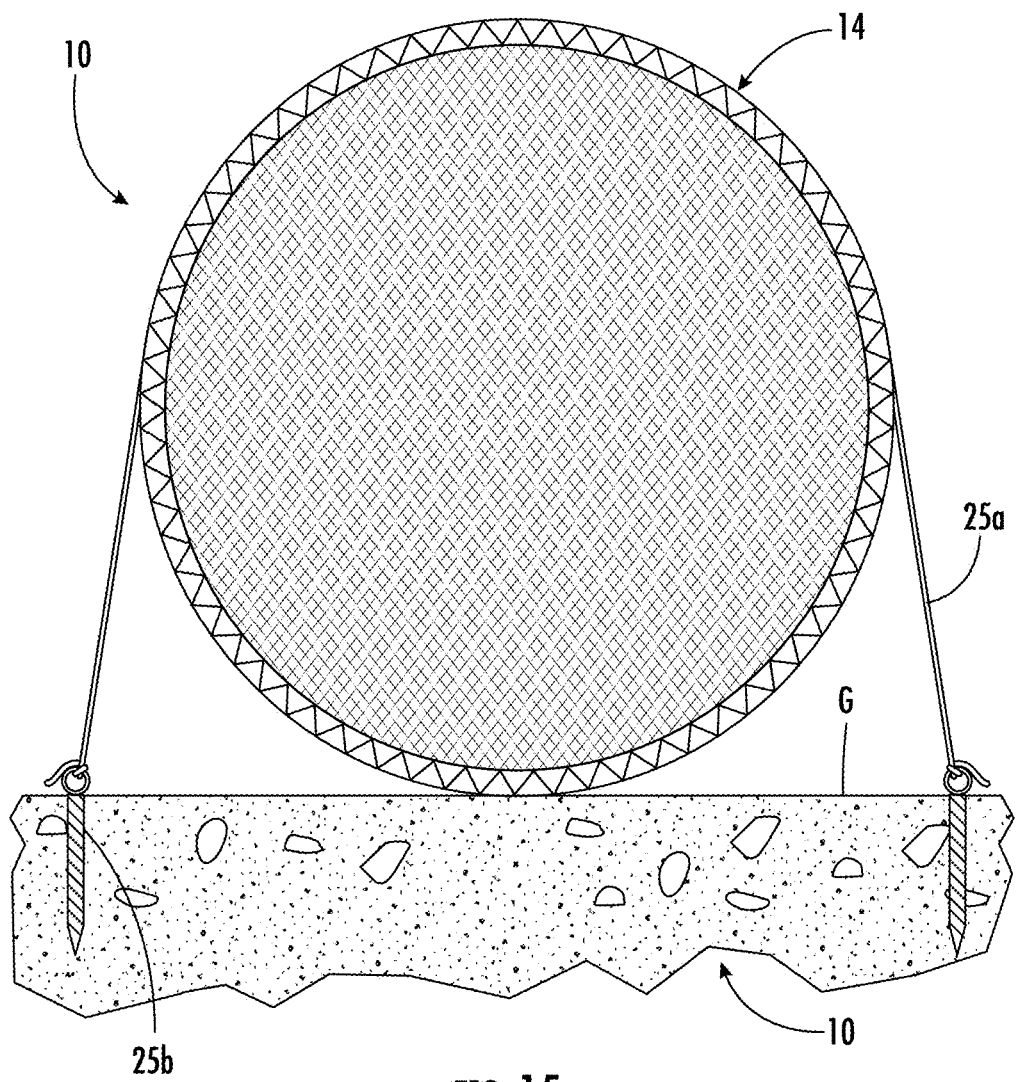
FIG. 15 is a schematic cross-sectional view of the synthetic bale of FIG. 1 along section 15-15.

FIG. 15 depicts a cross-sectional view of the synthetic bale 10 of FIG. 1 along section 15-15 and as manufactured by the steps described above (e.g., the method discussed relating to FIG. 2 or to FIG. 7). The synthetic bale 10 includes a plurality of bonded fibers which are randomly oriented within. It will be appreciated that the randomly oriented fibers are more effective at filtration than traditional synthetic bales. Typically, the desired length of the synthetic bale 10 is about 4 to 6 feet, about 8 to 10 feet, about 19 to 12 feet, about 14 to 16 feet, about 16 to 18 feet, or any other suitable length, but are not limited to such lengths. In some examples, the desired diameter of the synthetic bale 10 is about 8 to about 10 inches, about 10 to about 12 inches, about 12 to about 14 inches, about 14 to about 16 inches, about 16 to about 18 inches, or any other suitable diameter.

Figure 16:
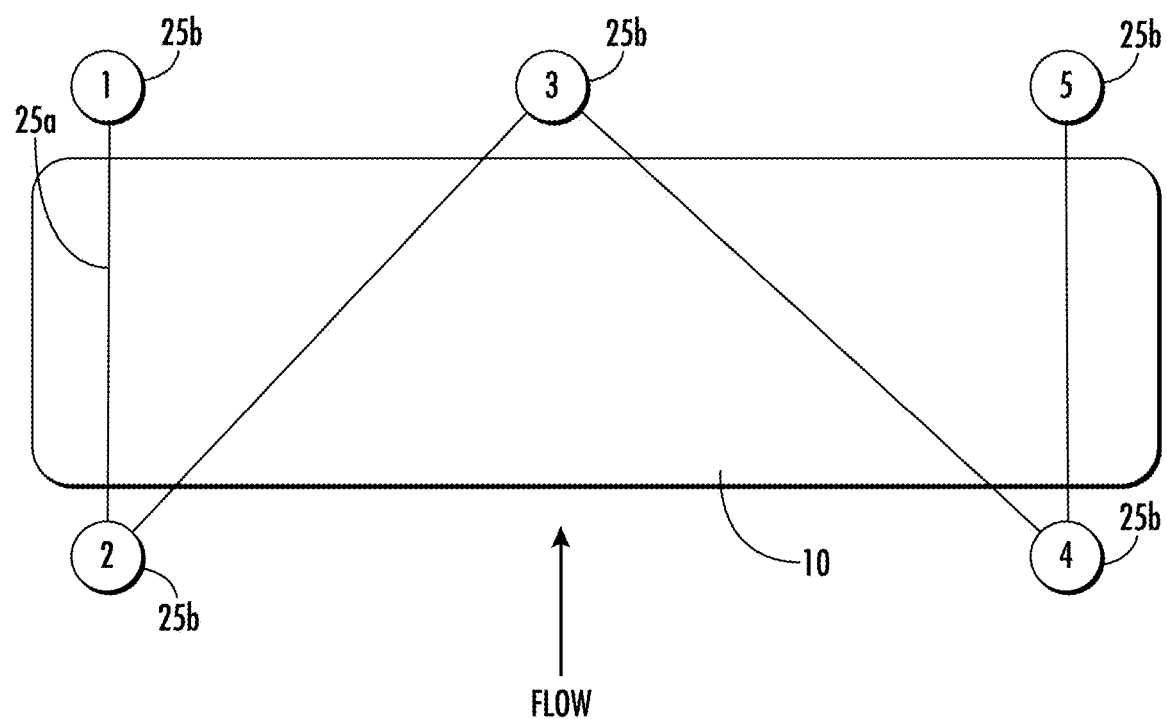
FIG. 16 is a schematic plan view of a mounting configuration for mounting the synthetic bale of FIG. 1.

The synthetic bale 10 is optionally ground-based, i.e., configured to be attached to the ground. In some examples, the synthetic bale 10 is attached to the ground using cords or ropes 25a secured by one or more tie-downs 25b (as shown in FIG. 1). In some examples, the synthetic bale 10 is attached to the ground using stakes, augers, or any other suitable 25b. In some examples, the synthetic bale 10 is tied down using a combination of cord 25a and tie-downs 25b. For example, FIG. 16 depicts a tie down scheme of the bale 10 using a cord 25a and a plurality of tie-downs 25b. In the depicted example, fluid is configured to flow from the side of the bale 10 including two tie-downs 25b. In other embodiments, the tie-downs 25b can be arranged in any suitable manner. It will also be appreciated that the bale can be configured to attach to the ground using any other suitable method. For example, the cord or rope could be different tying members such as wire, strap, bands, belts, cable, twine, or any other suitable tying mechanism. In some examples, the tie-downs could be wire anchors, rods, stakes, shafts, or any other mechanism capable of anchoring the tying mechanisms.

In some embodiments, multiple synthetic bales can be stacked on top of one another to enhance filtration, depending on the desired size of the synthetic bale configuration. In some embodiments, three synthetic bales 10 can be stacked on one another in a pyramid configuration (e.g., two bales on a lower layer and a single bale on the top or any other configuration). Stacking synthetic bales as discussed above has been found to increase the filtration effect.

In some embodiments, the synthetic bale 10 is used for erosion control, in other embodiments, the synthetic bale 10 can be used instead of or in combination with one or more French drains. In other embodiments, the synthetic bale 10 can be used for soaking up petroleum products, chemical products, etc. In other embodiments, the synthetic bale 10 can be used for stabilizing banks, streams or gradings. In some other embodiments, the synthetic bale 10 can be used to set boundaries in construction.

The breadth and scope of this disclosure should not be limited by any of the above-described example embodiments but should be defined only in accordance with the following claims and their equivalents.

What is claimed is:

1. A method of manufacturing a synthetic bale, the method comprising:
   heating a mixture of a first plurality of fibers with a second plurality of fibers, wherein each of the first plurality of fibers and the second plurality of fibers define an outer portion, and wherein the outer portion of the second plurality of fibers melt sufficiently to bond the outer portion of the second plurality of fibers with the first plurality of fibers to thereby create a plurality of bonded fibers;
   directing the bonded fibers into a chamber; and
   outputting the bonded fibers into a sheath, wherein the first plurality of fibers are 10-25% and the second plurality of fibers are 75-90% by weight, respectively, of the mixture of the first plurality of fibers and the second plurality of fibers.

2. The method of claim 1, wherein each of the first plurality of fibers and the second plurality of fibers are of a respective density, and further comprising the steps of: reducing the density of the first plurality of fibers and the density of the second plurality of fibers.

3. The method of claim 1, wherein the first plurality of fibers are synthetic fibers, and the second plurality of fibers are bicomponent fibers.

4. The method of claim 1, wherein the second plurality of fibers have a lower melting point than the first plurality of fibers.

5. The method of claim 3, wherein the synthetic fibers are polyester fibers.

6. The method of claim 1, wherein the first plurality of fibers and the second plurality of fibers are heated by blowing the first plurality of fibers and the second plurality of fibers through a conduit which is heated.

7. The method of claim 6, wherein the conduit is heated between 260 and 270 degrees Fahrenheit.

8. The method of claim 1, wherein the first plurality of fibers and the second plurality of fibers are mixed with one another prior to being put into the chamber.

9. The method of claim 1, wherein the bonded fibers are randomly oriented within the sheath.

10. The method of claim 1, further comprising the step of painting the sheath.

11. The method of claim 1, wherein the sheath is water permeable and is configured for use as a ground-based bale.

12. The method of claim 1, wherein the bonded fibers are output into the sheath by a pneumatic diverter.

13. The method of claim 12, wherein the pneumatic diverter is pneumatically movable between a flow diverting position and a non-flow diverting position.

14. The method of claim 13, wherein the bonded fibers are configured to flow through the diverter into the sheath when the pneumatic diverter is in the non-flow diverting position and hot air is configured to flow out of an exhaust when the pneumatic diverter is in the flow diverting position.

15. The method of claim 1, wherein the first and second plurality of fibers are located in a hopper operably connected to a conduit a having heated air flowing therethrough prior to heating the first and second plurality of fibers.

16. A system for manufacturing a synthetic bale within a sheath from a mixture of a first plurality of fibers and a second plurality of fibers, wherein each of the first plurality of fibers and the second plurality of fibers define an outer portion, the system comprising:
   a heater configured for heating the mixture of the first plurality of fibers with the second plurality of fibers, wherein the outer portion of the second plurality of fibers melt sufficiently to bond the outer portion of the second plurality of fibers with the first plurality of fibers to thereby create a plurality of bonded fibers;
   a chamber;
   a blower configured for directing the bonded fibers into the chamber; and
   means for outputting the bonded fibers into the sheath to form a ground-based bale.

17. The system of claim 16, wherein each of the first plurality of fibers and the second plurality of fibers are of a respective density, and further comprising an opener configured to reduce the density of the first plurality of fibers and the second plurality of fibers, wherein the opener is operably connected to the heater and the first plurality of fibers, and the second plurality of fibers are provided to the heater in the reduced density configuration.

18. The system of claim 16, further comprising a mixer configured to mix the first plurality of fibers and the second plurality of fibers, wherein the mixer is operably connected to the chamber and the mixer is configured to mix the first plurality of fibers and the second plurality of fibers prior to the first plurality of fibers and the second plurality of fibers entering the chamber.

19. The method of claim 1, wherein the sheath is a net.

20. The system of claim 16, wherein the sheath is a net.

21. A method of manufacturing a synthetic bale, the method comprising:
- heating a mixture of a first plurality of fibers with a second plurality of fibers, wherein each of the first plurality of fibers and the second plurality of fibers define an outer portion, causing an outer portion of the second plurality of fibers to melt sufficiently to bond the outer portion of the second plurality of fibers with the first plurality of fibers to thereby create a plurality of bonded fibers;
- directing the plurality of bonded fibers into a chamber; and
- outputting the plurality of bonded fibers into a net by a pneumatic diverter,
    - wherein the pneumatic diverter is pneumatically movable between a flow diverting position and a non-flow diverting position, and
    - wherein the plurality of bonded fibers are configured to flow through the diverter into the net when the pneumatic diverter is in the non-flow diverting position and hot air is configured to flow out of an exhaust when the pneumatic diverter is in the flow diverting position.

* * * * *